No. 754,671. PATENTED MAR. 15, 1904.
W. H. MINER.
TANDEM SPRING FRICTION DRAFT RIGGING.
APPLICATION FILED NOV. 30, 1903.
NO MODEL. 2 SHEETS—SHEET 1.
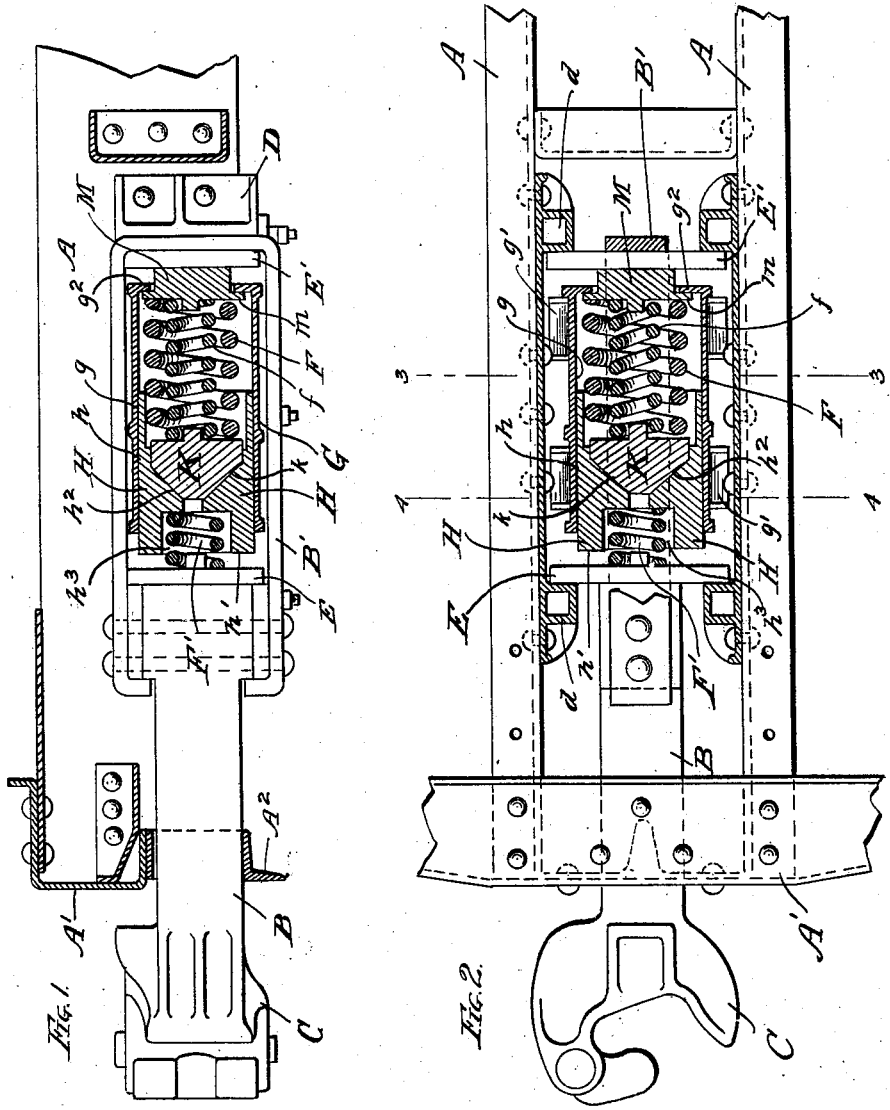
WITNESSES:
F. B. Townsend
INVENTOR.
William H. Miner.
BY
Munday, Evarts & Adcock
his ATTORNEYS No. 754,671. PATENTED MAR. 15, 1904.
W. H. MINER.
TANDEM SPRING FRICTION DRAFT RIGGING.
APPLICATION FILED NOV. 30, 1903.
NO MODEL. 2 SHEETS—SHEET 2.
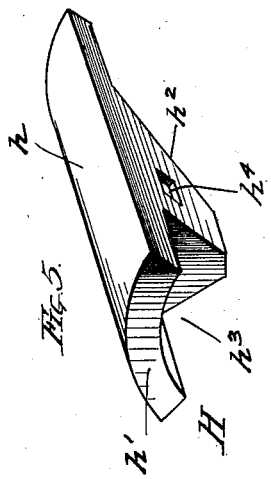
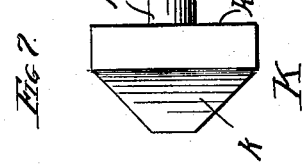
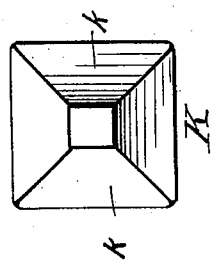
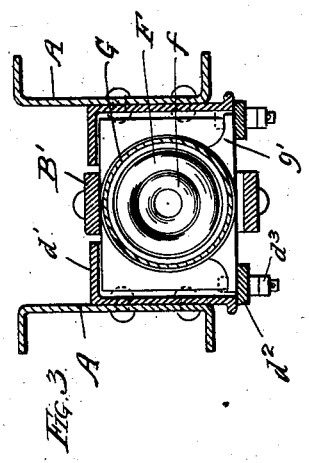
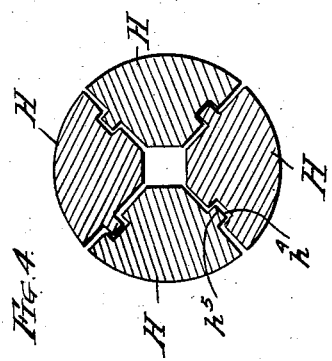
WITNESSES:
INVENTOR.
BY
his ATTORNEYS No. 754,671.

Patented March 15, 1904.

UNITED STATES PATENT OFFICE.

WILLIAM H. MINER, OF CHICAGO, ILLINOIS, ASSIGNOR TO W. H. MINER COMPANY, OF CHICAGO, ILLINOIS, A CORPORATION OF ILLINOIS.

TANDEM-SPRING FRICTION DRAFT-RIGGING.

SPECIFICATION forming part of Letters Patent No. 754,671, dated March 15, 1904.

Application filed November 30, 1903. Serial No. 183,111. (No model.)

*To all whom it may concern:*

Be it known that I, WILLIAM H. MINER, a citizen of the United States, residing in Chicago, in the county of Cook and State of Illinois, have invented a new and useful Improvement in Tandem-Spring Friction Draft-Rigging, of which the following is a specification.

My invention relates to tandem-spring friction draft-rigging for railway-cars.

The object of my invention is to provide a tandem-spring friction draft-rigging of a simple, strong, efficient, and durable construction, and in which the friction devices are adapted to coöperate with the ordinary longitudinal springs, followers, side plates or stop-castings, draw-bar, and draw-bar strap or extension.

My invention consists in the novel construction of parts and devices and in the novel combinations of parts and devices herein shown and described.

In the accompanying drawings, which form a part of this specification, Figure 1 is a central vertical section of a tandem-spring friction draft-rigging embodying my invention. Fig. 2 is a horizontal section; Fig. 3, a cross-section on line 3 3 of Fig. 2. Fig. 4 is a detail cross-section of the sliding segmental friction-blocks. Fig. 5 is a detail perspective view of one of the sliding segmental friction-blocks, and Figs. 6 and 7 are detail views of the wedge.

In the drawings, A represents the draft-timbers or center sills of a car, to which the draft-rigging or its side plates or stop-castings are attached, A' the front or cross sill, and A² the carry-iron.

B is the draw-bar; B', the draw-bar extension, preferably in the form of a strap or yoke, and C the coupler.

D D are the side plates or stop-castings, having the customary front and rear stops $d\ d$ for the followers E E' to abut against and upper and lower guides $d'\ d^2$ for the followers to reciprocate in or between, the upper guide $d'$ being, preferably, an integral flange on the side plates or stop-castings D D and the lower guides $d^2\ d^2$ being preferably removable and secured by bolts $d^3$ to the side plates or stop-castings D D.

F is a longitudinally-arranged spring directly behind the draw-bar and in the line of draft, there being also, preferably, a small spring $f$ nesting within it, and F' is a second or tandem longitudinally-arranged spring directly behind the draw-bar and in line with the spring F and interposed between the front follower E and the sliding friction-blocks H, the spring F abutting at one end against the front follower E and at its other end against the sliding segmental friction-blocks H, which are recessed to receive it. A small spring may preferably be nested within the spring F'.

G is a sliding friction shell or case having an interior friction-surface $g$, preferably cylindrical in form. The friction-shell G is provided with integral external feet or projections $g'$ to rest and slide upon the guides of the side plates or stop-castings.

H H are coöperating sliding friction-blocks inside the sliding case or shell G, the same being preferably four in number and quadrant-shaped in cross-section and having each an external friction-face $h$ parallel to and fitting the coöperating friction-face $g$ of the sliding friction case or shell G. Each of the segmental sliding friction-blocks H has a square or right-angle end bearing $h'$ abutting against the front follower E and an inclined or tapering end face $h^2$ at its longitudinally middle portion to abut against one of the correspondingly-inclined faces $k$ of the wedge K, the wedge having four faces $k$, one for each of the sliding friction-blocks H, and bearing against said sliding friction-blocks at or near their middle, so as to spread or press the sliding friction-blocks at their middle portions outwardly against their surrounding sliding friction shell or case G, which confines them against outward, radial, lateral, or transverse movement, while permitting the friction-blocks to slide longitudinally in respect to the shell or case. The sliding friction-blocks H H are furnished with a recess $h^3$ to receive the spring F', the recess being deep enough to nest the spring F' when compressed, so that when said spring F' is compressed the front follower E will then directly engage the square or right-angle end bearing $h'$ of the sliding segmental friction-blocks H. As the sliding friction-blocks are engaged and pressed centrally or medianly, as to to their length, by the wedge K the friction-blocks automatically accommodate themselves to the friction shell or case, and the friction-surfaces $h$ of the sliding friction-blocks engage the coöperating friction-surface $g$ of the shell or case G with a uniform pressure from end to end of the friction-blocks and without any tendency toward causing one end of the friction-blocks to scrape, gouge, or cut into the friction shell or case after the manner of a planing-tool, as is likely to be the case where the friction-blocks are engaged by wedges at both ends thereof, and especially where one of the wedges has a fixed, solid, or unyielding abutment, while the wedge at the opposite end has a yielding or spring-supported abutment. The wedge K has a flat straight face $k'$, against which one end of the spring F bears, and a central stud $k^2$ for guiding or holding the spring in position. The opposite or rear end of the spring F abuts against the rear follower E', preferably through an independent or loose spring seat-block M, having an external flange or shoulder $m$, which engages an internal flange or shoulder $g^2$ on the sliding friction case or shell G. The independent spring seat-block M permits a partial initial compression of the spring before the longitudinally-sliding friction-shell G and friction-blocks H begin to slide longitudinally one in respect to the other, and thus bringing the frictional resistance into action. In pulling, the sliding friction-blocks H are held stationary by the front follower E and front stops $d$, while the rear follower moves with the draw-bar and first initially compresses the tandem spring F' and the spring F also until the rear follower by the further movement comes in contact with the rear end of the friction shell or case G, which is then moved longitudinally forward by the further movement of the draw-bar, and thus adding the frictional resistance of the interengaging sliding friction-surfaces $g$ $h$, which are parallel to the line of draft and longitudinal movement of the draw-bar, to the direct resistance of the spring F as the same is further compressed by the further forward movement of the draw-bar. In buffing the operation is the same, but the reverse, the seat-block M being held stationary by the rear follower E' and rear stops $d$, while the front follower (after compressing the tandem spring F') and friction-blocks H H and friction case or shell G move with the draw-bar by reason of the frictional grip produced by the spring F and wedge K between the sliding friction-blocks H and case or shell G, thus cushioning the blow by the direct action of the springs F' F $f$ until the rear end of the shell or case G engages the rear follower E', when the further rearward movement of the draw-bar will cause the friction-blocks H H to slide in respect to the shell or case G and add the frictional resistance to the direct resistance of the springs as the spring F is further compressed by the further rearward movement of the draw-bar. As the sliding friction-blocks H are pressed against the sliding friction-shell G only by a single spring-supported wedge at or near the longitudinal middle of the friction-blocks, the frictional engagement grip or pressure between the friction blocks and shell is relieved or proportionately relieved, as the spring expands when the draw-bar is relieved from strain, so that there is little tendency of the friction blocks and shell to stick in respect to each other.

The sliding segmental friction-blocks H H are preferably provided on their meeting radial faces with interengaging recesses and projections $h^4$ $h^5$ to keep the same in position or registry with each other.

I claim—

1. In a tandem-spring friction draft-rigging for railway-cars, the combination with side plates or stop-castings having front and rear stops and upper and lower guides, a draw-bar, draw-bar extension, front and rear followers, and longitudinally-arranged tandem springs, of a longitudinally-sliding friction shell or case, alternately held stationary by one follower and longitudinally moved by the other, and having an interior friction-surface longitudinally parallel to the line of draft, segmental longitudinally-sliding friction-blocks inside said friction case or shell and having each an exterior friction-face in sliding frictional engagement with said shell, and provided each at one end with a recess to receive one of said springs, and a square or right-angle end bearing for one follower to abut against after the tandem spring at this end of said friction-blocks is compressed, and furnished each with an inclined bearing-face at its longitudinally middle portion, and a wedge bearing against the inclined faces of said sliding friction-blocks, the other tandem spring bearing at one end against said wedge and at its other end against the other follower, substantially as specified.

2. In a tandem-spring friction draft-rigging for railway-cars, the combination with side plates or stop-castings having front and rear stops and upper and lower guides, a draw-bar, draw-bar extension, front and rear followers, and longitudinally-arranged tandem springs, of a longitudinally-sliding friction shell or case, alternately held stationary by one follower and longitudinally moved by the other, and having an interior friction-surface longitudinally parallel to the line of draft, segmental longitudinally-sliding friction-blocks inside said friction case or shell and having each an exterior friction-face in sliding frictional engagement with said shell, and provided each at one end with a recess to receive one of said springs, and a square or right-angle end bearing for one follower to abut against after the tandem spring at this end of said friction-blocks is compressed, and furnished each with an inclined bearing-face at its longitudinally middle portion, and a wedge bearing against the inclined faces of said sliding friction-blocks, the other tandem spring bearing at one end against said wedge and at its other end against the other follower, and an independent seat-block interposed between said last-mentioned spring and the follower at the end thereof to permit a partial compression of the spring before the frictional resistance comes into action, substantially as specified.

3. In a tandem-spring friction draft-rigging for railway-cars, the combination with side plates or stop-castings having front and rear stops and upper and lower guides, a draw-bar, draw-bar extension, front and rear followers, and longitudinally-arranged tandem springs, of a longitudinally-sliding friction shell or case alternately held stationary by one follower and longitudinally moved by the other, and having an interior friction-surface longitudinally parallel to the line of draft, segmental longitudinally-sliding friction-blocks inside said friction case or shell and having each an exterior friction-face in sliding frictional engagement with said shell, and provided each at one end with a recess to receive one of said springs, and a square or right-angle bearing for one follower to abut against after the tandem spring at this end of said friction-blocks is compressed and furnished each with an inclined bearing-face at its longitudinal middle portion, and a wedge bearing against the inclined faces of said sliding friction-blocks, the other tandem spring bearing at one end against said wedge and at its other end against the other follower, and an independent seat-block interposed between said last-mentioned spring and the follower at the end thereof to permit a partial compression of the spring before the frictional resistance comes into action, said seat-block having an external flange or shoulder, and said sliding friction shell or case having an interior flange or shoulder adapted to engage the flange or shoulder on the seat-block, substantially as specified.

4. In a tandem-spring friction draft-rigging for railway-cars, the combination with side plates or stop-castings having front and rear stops and upper and lower guides, a draw-bar, draw-bar extension, front and rear followers, and longitudinally-arranged tandem springs, of a longitudinally-sliding friction shell or case, alternately held stationary by one follower and longitudinally moved by the other, and having an interior friction-surface longitudinally parallel to the line of draft, segmental longitudinally-sliding friction-blocks inside said friction case or shell and having each an exterior friction-face in sliding frictional engagement with said shell, and provided each at one end with a recess to receive one of said springs, and a square or right-angle end bearing for one follower to abut against after the tandem spring at this end of said friction-blocks is compressed, and furnished each with an inclined bearing-face, and a wedge bearing against the inclined faces of said sliding friction-blocks, the other tandem spring bearing at one end against said wedge and at its other end against the other follower, substantially as specified.

5. In a tandem-spring friction draft-rigging, the combination with the draw-bar, draw-bar extension, side plates or stop-castings, front and rear followers, two tandem longitudinally-arranged springs, a longitudinally-sliding friction-shell having an interior friction-surface, segmental sliding friction-blocks inside said shell having exterior friction-faces engaging the shell and provided each with a recess at one end to receive one of said tandem springs, and a plain or non-wedging bearing-face to engage one follower after the spring contained in the recesses of the friction-blocks is compressed, a wedge or spreader bearing against said sliding friction-blocks, the other tandem spring being interposed between said wedge and the other follower, substantially as specified.

6. In a tandem-spring friction draft-rigging, the combination with the draw-bar, draw-bar extension, side plates or stop-castings, front and rear followers, two tandem longitudinally-arranged springs, a longitudinally-sliding friction-shell having an interior friction-surface, segmental sliding friction-blocks inside said shell having exterior friction-faces engaging the shell and provided each with a recess at one end to receive one of said tandem springs, and a plain or non-wedging bearing-face to engage one follower after the spring contained in the recesses of the friction-blocks is compressed, a wedge or spreader bearing against said sliding friction-blocks, the other tandem spring bearing at one end against said wedge, and an independent seat-block abutting against one follower and against one end of said last-mentioned spring, substantially as specified.

7. In a tandem-spring friction draft-rigging, the combination with the draw-bar, draw-bar extension, side plates or stop-castings, front and rear followers, two tandem longitudinally-arranged springs, a longitudinally-sliding friction-shell having an interior friction-surface, segmental sliding friction-blocks inside said shell having exterior friction-faces engaging the shell and provided each with a recess at one end to receive one of said tandem springs, and a plain or non-wedging bearing-face to engage one follower after the spring contained in the recesses of the friction-blocks is compressed, a wedge or spreader bearing against said sliding friction-blocks, the other tandem spring being interposed between said wedge, an independent seat-block abutting against one follower and against one end of said last-mentioned spring, said seat-block and friction shell or case having interengaging shoulders, substantially as specified.

WILLIAM H. MINER.

Witnesses:
 EDMUND ADCOCK,
 H. M. MUNDAY.